US011494588B2

(12) United States Patent
Staar et al.

(10) Patent No.: US 11,494,588 B2
(45) Date of Patent: Nov. 8, 2022

(54) GROUND TRUTH GENERATION FOR IMAGE SEGMENTATION

(71) Applicant: INTERNATIONAL BUSINESS MACHINES CORPORATION, Armonk, NY (US)

(72) Inventors: Peter Willem Jan Staar, Wädenswil (CH); Michele Dolfi, Zurich (CH); Christoph Auer, Zurich (CH); Leonidas Georgopoulos, Zurich (CH); Konstantinos Bekas, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 16/811,473

(22) Filed: Mar. 6, 2020

(65) Prior Publication Data

US 2021/0279516 A1 Sep. 9, 2021

(51) Int. Cl.
*G06K 9/62* (2022.01)
*G06V 10/22* (2022.01)
(Continued)

(52) U.S. Cl.
CPC ......... *G06K 9/6257* (2013.01); *G06K 9/6267* (2013.01); *G06V 10/22* (2022.01); *G06V 20/64* (2022.01); *G06V 30/10* (2022.01)

(58) Field of Classification Search
CPC .............................. G06V 20/64; G06V 10/22
See application file for complete search history.

(56) References Cited

U.S. PATENT DOCUMENTS

| 5,021,989 A | 6/1991 | Fujisawa |
| 5,781,785 A | 7/1998 | Rowe |

(Continued)

FOREIGN PATENT DOCUMENTS

| CN | 101689203 B | 9/2013 |
| CN | 108898137 A | 11/2018 |

(Continued)

OTHER PUBLICATIONS

Tao, Logical Labeling of Fixed Layout PDF Documents Using Multiple Contexts, 2014 11th IAPR International Workshop on Document Analysis Systems (Year: 2014).

(Continued)

*Primary Examiner* — Edward Park
(74) *Attorney, Agent, or Firm* — Daniel G. DeLuca (57) ABSTRACT

A method, system and computer program product to generate a training data set for image segmentation applications, comprising providing a set of input documents of a first format. The input documents each comprise one or more pages. The input documents are split into individual document pages and parsed. Parsing comprises identifying a predefined set of items including position information of the position of the predefined set of items in the individual document pages; generating a bitmap image of a second format for each individual document page of the first format. The bitmap image comprises a predefined number of pixels. A mask is generated for each individual document. The mask comprises the predefined number of pixels of the corresponding bitmap image. Generating the mask comprises assigning an encoded class label to each pixel of the mask based on the position information of identified items of the predefined set of items.

22 Claims, 8 Drawing Sheets

(51) Int. Cl.
  *G06V 20/64* (2022.01)
  *G06V 30/10* (2022.01)

(56) References Cited

U.S. PATENT DOCUMENTS

| | | | |
|---|---|---|---|
| 5,818,966 | A | 10/1998 | Prasad |
| 6,401,097 | B1 | 6/2002 | Mccotter |
| 6,981,209 | B1 | 12/2005 | Parikh |
| 7,543,229 | B2 | 6/2009 | Peiro |
| 9,032,006 | B2 | 5/2015 | Bekas |
| 9,262,380 | B2 | 2/2016 | Bekas |
| 9,445,108 | B1 * | 9/2016 | Ahmed ............... H04N 19/103 |
| 10,089,742 | B1 | 10/2018 | Lin et al. |
| 10,210,178 | B2 | 2/2019 | Souche et al. |
| 10,331,976 | B2 | 6/2019 | Akata |
| 2004/0006742 | A1 | 1/2004 | Slocombe |
| 2004/0034455 | A1 | 2/2004 | Simonds |
| 2005/0053283 | A1 | 3/2005 | Wakeam |
| 2006/0200752 | A1 | 9/2006 | Sellers |
| 2006/0236237 | A1 | 10/2006 | Peiro |
| 2007/0168382 | A1 | 7/2007 | Tillberg |
| 2008/0168342 | A1 | 7/2008 | Shur |
| 2008/0317343 | A1 | 12/2008 | Ferman |
| 2009/0019011 | A1 | 1/2009 | Lee |
| 2009/0110268 | A1 | 4/2009 | Dejean |
| 2010/0131614 | A1 | 5/2010 | Bremer, Jr. |
| 2011/0255791 | A1 | 10/2011 | Abdo |
| 2014/0006982 | A1 | 1/2014 | Wabyick |
| 2014/0013215 | A1 | 1/2014 | Sesum |
| 2014/0314319 | A1 | 10/2014 | Hamel |
| 2014/0376804 | A1 | 12/2014 | Akata |
| 2015/0199314 | A1 | 7/2015 | Ratnakar |
| 2015/0199821 | A1 | 7/2015 | Lyubarskiy |
| 2015/0262007 | A1 | 9/2015 | Sesum |
| 2017/0213139 | A1 | 7/2017 | Sawant |
| 2017/0351681 | A1 | 12/2017 | Bekas |
| 2018/0075368 | A1 | 3/2018 | Brennan |
| 2018/0097812 | A1 | 4/2018 | Gillett et al. |
| 2018/0101726 | A1 | 4/2018 | Wang et al. |
| 2018/0300323 | A1 | 10/2018 | Lee et al. |
| 2018/0341688 | A1 | 11/2018 | Ganesh |
| 2018/0365248 | A1 | 12/2018 | Zheng |
| 2019/0102674 | A1 | 4/2019 | Kwant et al. |
| 2019/0302997 | A1 | 10/2019 | Kouda |
| 2019/0385059 | A1 | 12/2019 | Huang |
| 2020/0005154 | A1 | 1/2020 | Herbster |
| 2020/0045354 | A1 | 2/2020 | Gao |
| 2020/0294187 | A1 | 9/2020 | Staar |
| 2021/0279400 | A1 | 9/2021 | Staar |
| 2021/0279532 | A1 | 9/2021 | Staar |
| 2021/0279636 | A1 | 9/2021 | Staar |

FOREIGN PATENT DOCUMENTS

| | | |
|---|---|---|
| CN | 110110258 A | 8/2019 |
| CN | 110188189 A | 8/2019 |
| JP | 08227422 A | 9/1996 |
| JP | 2006031129 A | 2/2006 |
| WO | 2018213205 A1 | 11/2018 |
| WO | 2021176281 A1 | 9/2021 |
| WO | 2021176282 A1 | 9/2021 |

OTHER PUBLICATIONS

Mell et al., "The NIST Definition of Cloud Computing", Recommendations of the National Institute of Standards and Technology, NIST Special Publication 800-145, Sep. 2011, 7 pages.

Ahmed et al., "A Generic Method for Automatic Ground Truth Generation of Camera-Captured Documents", arXiv: 1605.011891, May 4, 2016, pp. 1-15.

Moll et al., "Truthing for Pixel-Accurate Segmentation", The Eighth IAPR International Workshop on Document Analysis Systems, Sep. 16-19, 2008, pp. 379-385.

Schulman, "Recognizing and Generating Natural Language Referring Expressions in Images", Thesis Submitted in Partial Fulfillment of the Requirements for the Master of Sciences Degree Under the Supervision of: Prof. Michael Elhadad, Ben—Gurion University of the Negev, Aug. 21, 2018, 72 pages.

Kahou et al., "FigureQA: An Annotated Figure Dataset for Visual Reasoning", Workshop Track—ICLR 2018, arXiv: 1710.07300v2, Feb. 22, 2018, pp. 1-20.

Konyushkova et al., "Discovering General-Purpose Active Learning Strategies", arXiv:1810.04114v2, Apr. 2, 2019, pp. 1-10.

IBM: List of IBM Patents or Patent Applications Treated as Related (Appendix P), Mar. 12, 2020, pp. 1-2.

Pending U.S. Appl. No. 16/811,457, filed Mar. 6, 2019, entitled: "Memory-Efficient Document Processing", 39 pages.

Pending U.S. Appl. No. 16/811,490, filed Mar. 6, 2019, entitled: "Digital Image Processing", 38 pages.

Pending U.S. Appl. No. 16/811,421, filed Mar. 6, 2019, entitled: "Efficient Ground Truth Annotation", 35 pages.

International Searching Authority, "Notification of Transmittal of the international Search Report and the Written Opinion of the International Searching Authority, or Declaration," Patent Cooperation Treaty, Apr. 29, 2021, 7 pages, International Application No. PCT/IB2021/050612.

International Searching Authority, "Notification of Transmittal of the international Search Report and the Written Opinion of the International Searching Authority, or Declaration," Patent Cooperation Treaty, May 7, 2021, 7 pages, International Application No. PCT/IB2021/050648.

IBM: List of IBM Patents or Patent Applications Treated as Related (Appendix P), Nov. 5, 2021, 2 pages.

Kodirov, 2017, arXiv sections 1-6.

Xian, 2018, arXiv sections 1-6.

* cited by examiner

FIG. 1

Generate training data set

FIG. 2a

FIG. 2b    Training    210

FIG. 2c    Inference    220

451     text cell: [ { ($x_0$, $y_0$), ($x_1$, $y_1$), text = "Text1"}]
452     text cell: [ { ($x_0$, $y_0$), ($x_1$, $y_1$), text = "Text2"}]
453     text cell: [ { ($x_0$, $y_0$), ($x_1$, $y_1$), text = "Text3"}]
454     path: [ { ($x_0$, $y_0$), ($x_1$, $y_1$), ($x_2$, $y_2$), ($x_3$, $y_3$), color = black, width = 2.5 }]

GROUND TRUTH GENERATION FOR IMAGE SEGMENTATION

BACKGROUND

The present invention relates to a computer-implemented method to generate training-data as ground-truth for image segmentation applications.

The present invention further relates to a corresponding system and a corresponding computer program product.

The extraction of fundamental components from scanned documents, e.g. text cells, paragraphs, lines etc. may be done in two fundamentally different ways. Either one uses a rule-based method, in which one encodes explicitly certain properties of these components and uses those for their identification and extraction. Another more popular way is to use a machine learning approach, in which one uses training data to learn those properties implicitly. This approach is more general, but typically requires lots of annotated data as training data which is hard and costly to obtain. Such training data is often referred to as ground-truth.

The generation of such ground-truth, in particular pixel-perfect ground-truth, is very difficult to obtain through human annotation. In essence, one needs to assign to each pixel in the image a class-label.

Accordingly, there is a need for methods which facilitate to generate such training data in an efficient way.

SUMMARY

According to an embodiment, the invention is embodied as a computer-implemented method to generate a training data set for image segmentation applications.

The method comprises providing a set of input documents of a first format, wherein the input documents each comprise one or more document pages. The method further comprises splitting the input documents into its individual document pages and parsing the individual document pages of the first format. The parsing comprises identifying a predefined set of items including position information of the position of the predefined set of items in the individual document pages. The method comprises generating a bitmap image of a second format for each individual document page of the first format, wherein the bitmap image comprises a predefined number of pixels, and generating a mask for each individual document, wherein the mask comprises the predefined number of pixels of the corresponding bitmap image. The generating of the mask comprises assigning an encoded class label to each pixel of the mask based on the position information of identified items of the predefined set of items.

Such an embodied method may allow to generate ground truth for image segmentation applications, in particular pixel perfect ground truth, in an advanced way.

According to an embodiment, the assigning of the class label comprises evaluating whether the respective pixel of the mask overlaps with an identified item of the predefined set of items or not. This is an efficient way to assign the class label.

According to an embodiment, the predefined set of items comprises text cells and the position information of the text cells include bounding box coordinates of bounding boxes of the text cells. The identification of such text cells may provide basic information of bitmap images in an efficient way.

According to an embodiment, the predefined set of items comprises paths and the position information comprises path coordinates and the width of the path. Such paths may provide basic information of bitmap images in an efficient way.

According to an embodiment, the mask is a 3-dimensional mask with the dimensions number of pixels in height, number of pixels in width and number of class labels.

According to an embodiment, the bitmap images are 3-dimensional images with dimensions number of pixels in height, number of pixels in width and number of color channels.

According to an embodiment, the generating of the mask comprises initializing the encoded class label of all pixels of the mask to a first value and assigning a second value as encoded class label to all pixels of the mask that overlap with an identified item of the predefined set of items according to the position information of the predefined set of items. This is a particularly efficient approach for generating the mask.

According to an embodiment, the method further comprises providing the bitmap image and the corresponding mask as tuple to the training data set for the image segmentation application. This allows to enhance the training data set with new ground-truth.

According to another embodiment a system for performing a computer-implemented method for generating training data sets of image segmentation applications is provided. The system comprises a processor and a computer readable memory. The system is configured to provide a set of input documents of a first format, the input documents each comprising one or more document pages. The system is further configured to split the input documents into its individual document pages and to parse the individual document pages of the first format, wherein the parsing comprises identifying a predefined set of items including position information of the position of the predefined set of items in the individual document pages. The system is further configured to generate a bitmap image of a second format for each individual document page of the first format, wherein the bitmap image comprises a predefined number of pixels. The system is further configured to generate a mask for each individual document page, the mask comprising the predefined number of pixels of the corresponding bitmap image. The system is further configured to assign an encoded class label to each pixel of the mask based on the position information of identified items of the predefined set of items.

According to another embodiment a computer program product for generating training data sets of image segmentation applications by a system comprising a processor and computer readable memory is provided. The computer program product comprises a computer readable storage medium having program instructions embodied therewith, the program instructions executable by the system to cause the system to perform a method comprising providing a set of input documents of a first format, wherein the input documents each comprise one or more document pages. The method further comprises splitting the input documents into its individual document pages, parsing the individual document pages of the first format. The parsing comprises identifying a predefined set of items including position information of the position of the predefined set of items in the individual document pages. The method further comprises generating a bitmap image of a second format for each individual document page of the first format, the bitmap image comprising a predefined number of pixels. The method further comprises generating a mask for each individual document page, the mask comprising the predefined number of pixels of the corresponding bitmap image, and assigning an encoded class label to each pixel of the mask based on the position information of identified items of the predefined set of items.

According to another embodiment a training data set obtainable by a computer-implemented method of the previous embodiment is provided.

According to another embodiment a computer-implemented method for training an image segmentation application, a cognitive model for an image segmentation application encoded on a non-transitory computer readable medium and a computer-implemented method for performing an image segmentation application are provided.

Embodiments of the invention will be described in more detail below, by way of illustrative and non-limiting examples, with reference to the accompanying drawings.

BRIEF DESCRIPTION OF THE SEVERAL VIEWS OF THE DRAWINGS

FIG. 4b shows an example of an individual page file of a third format that corresponds to the parsed version of the individual page of FIG. 4a;

FIG. 6 shows a mask that has been generated by parsing the individual document page of the first format as shown in FIG. 4a.

DETAILED DESCRIPTION

In reference to FIGS. 1-7, some general terms of embodiments of the invention are described.

Embodiments of the invention consider that there are generally two fundamentally different types of documents. On the one hand, there are programmatic documents, in which the fundamental components are represented by code. Such programmatic documents include e.g. documents in the Portable Document Format (PDF) or in Microsoft-Word format. A programmatic document may be generally defined as a document which is of the nature of or according to a program, schedule, or method.

On the other hand, there are bitmap documents, e.g. scanned documents, where the fundamental components are represented by colored pixels in an image. This includes e.g. documents in Portable Networks Graphic (png), Joint Photographics Expert Group (JPEG) or Tagged Image File Format (TIFF) format.

While it is rather easy to transfer any programmatic document into a bitmap document, the opposite is not true. For the latter, one needs either carefully tuned rule base algorithms or machine learning algorithms. The latter need lots of training data which is often referred to as ground-truth.

The term ground truth may generally refer to information provided by direct observation (i.e. empirical evidence) as opposed to information provided by inference. In the field of image segmentation and image analysis, it may refer in particular to the correct identity, position, size and coordinates of the individual symbols, e.g. the characters, as well as of text cells comprising words, paragraphs or titles and other layout information such as information on paths and bitmap resources.

The position and layout of text cells may be represented by bounding boxes. While generally bounding boxes may be character bounding boxes of the individual characters of a respective electronic image, according to embodiments of the present invention the term bounding box shall in particular refer to more global bounding boxes or in other words layout bounding boxes of the layout of the documents to be processed. This includes in particular bounding boxes which demarcate text cells comprising words, paragraphs, titles or footnotes of the electronic image.

Image segmentation algorithms may be used e.g. in Optical Character Recognition (OCR)/line detection methods and algorithms to extract data encoded in scanned documents/images. Examples of such data-types are the text (typed, hand-written, signatures, stamps) and lines (originating from tables, line & scatter plots, etc.). Such image segmentation applications may be used e.g. for computer vision.

Image segmentation may be defined according to embodiments as a method for partitioning a digital image into multiple segments. The segments may encompass a plurality of pixels which form predefined items or in other words objects. Image segmentation is typically used to locate such objects/predefined items and boundaries in images. More precisely, image segmentation is the process of assigning a class-label to each pixel in the image.

Image segmentation algorithms need annotated, pixel-perfect ground-truth, i.e. they need to assign a class-label to each pixel in the image).

Embodiments of the invention provide a computer-implemented method to generate training data and ground-truth for image analysis and image segmentation algorithms and applications in an efficient way.

Figure 1:
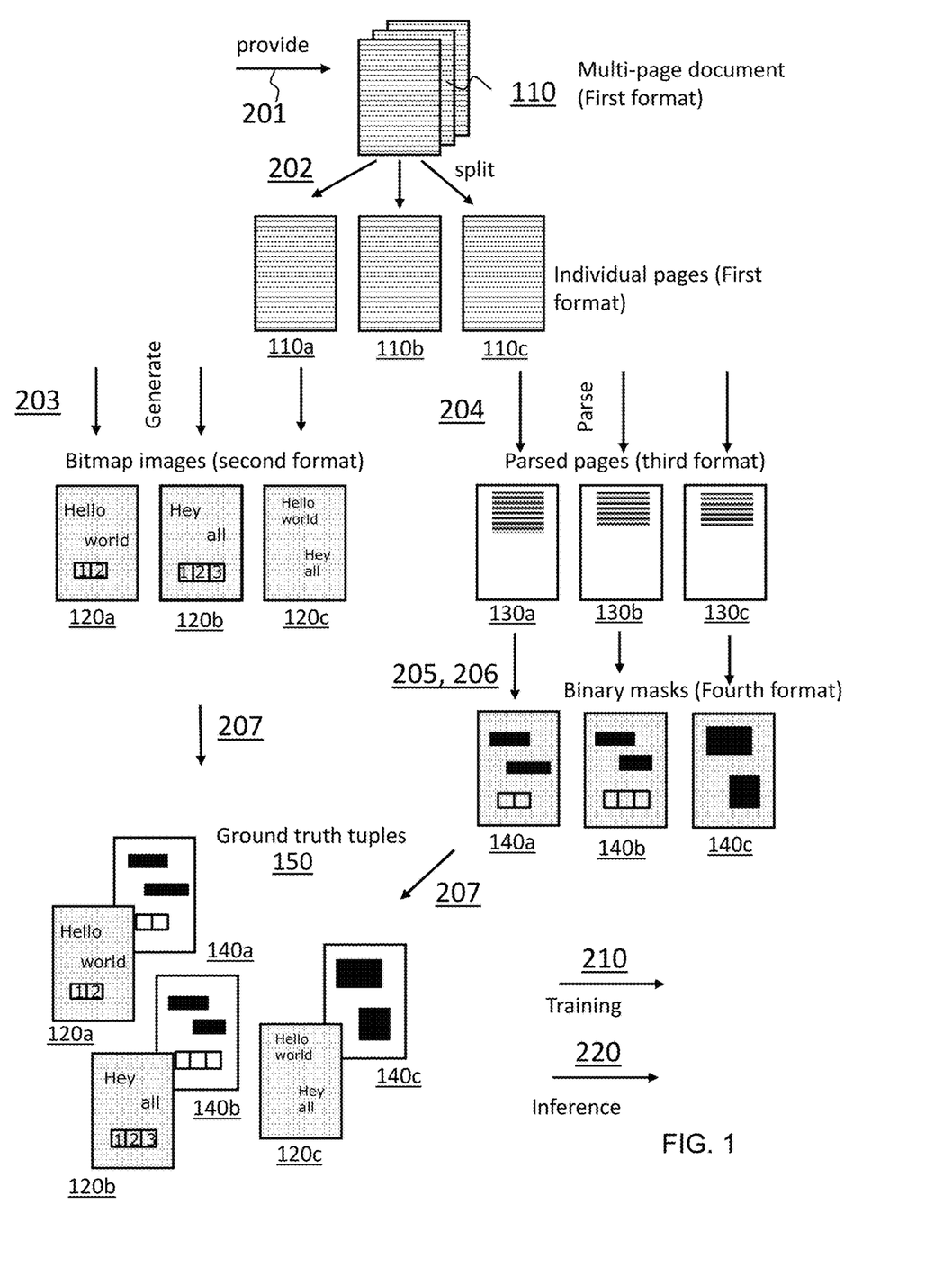
FIG. 1 illustrates a computer-implemented method to generate training data according to an embodiment of the invention.
Figure 2A:
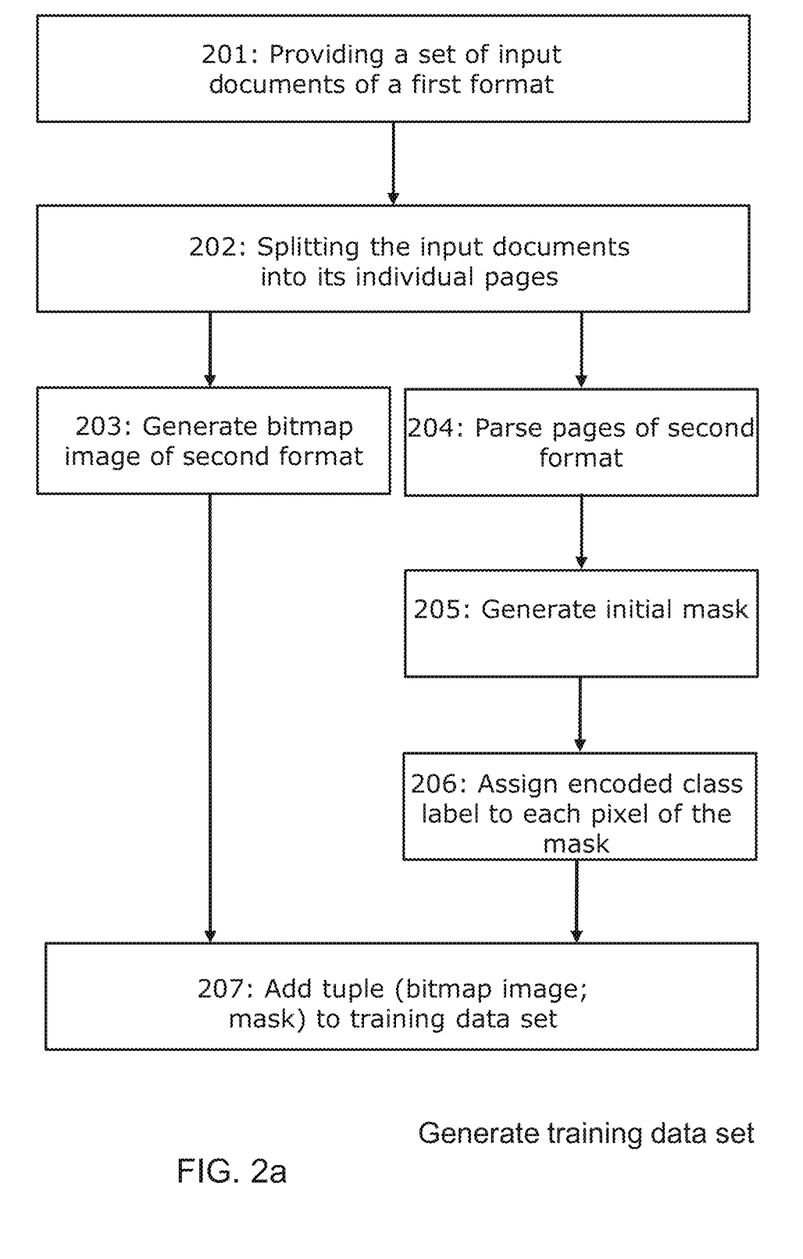
FIG. 2a shows a corresponding flow chart of the method illustrated in FIG. 1.

FIG. 1 illustrates a computer-implemented method to generate a training data set for image segmentation applications according to an embodiment of the invention. FIG. 2a shows a corresponding flow chart of the method illustrated in FIG. 1 and FIG. 3 shows a schematic block diagram of computing system which may be used to perform the computer-implemented method as illustrated in FIGS. 1 and 2a.

Figure 3:
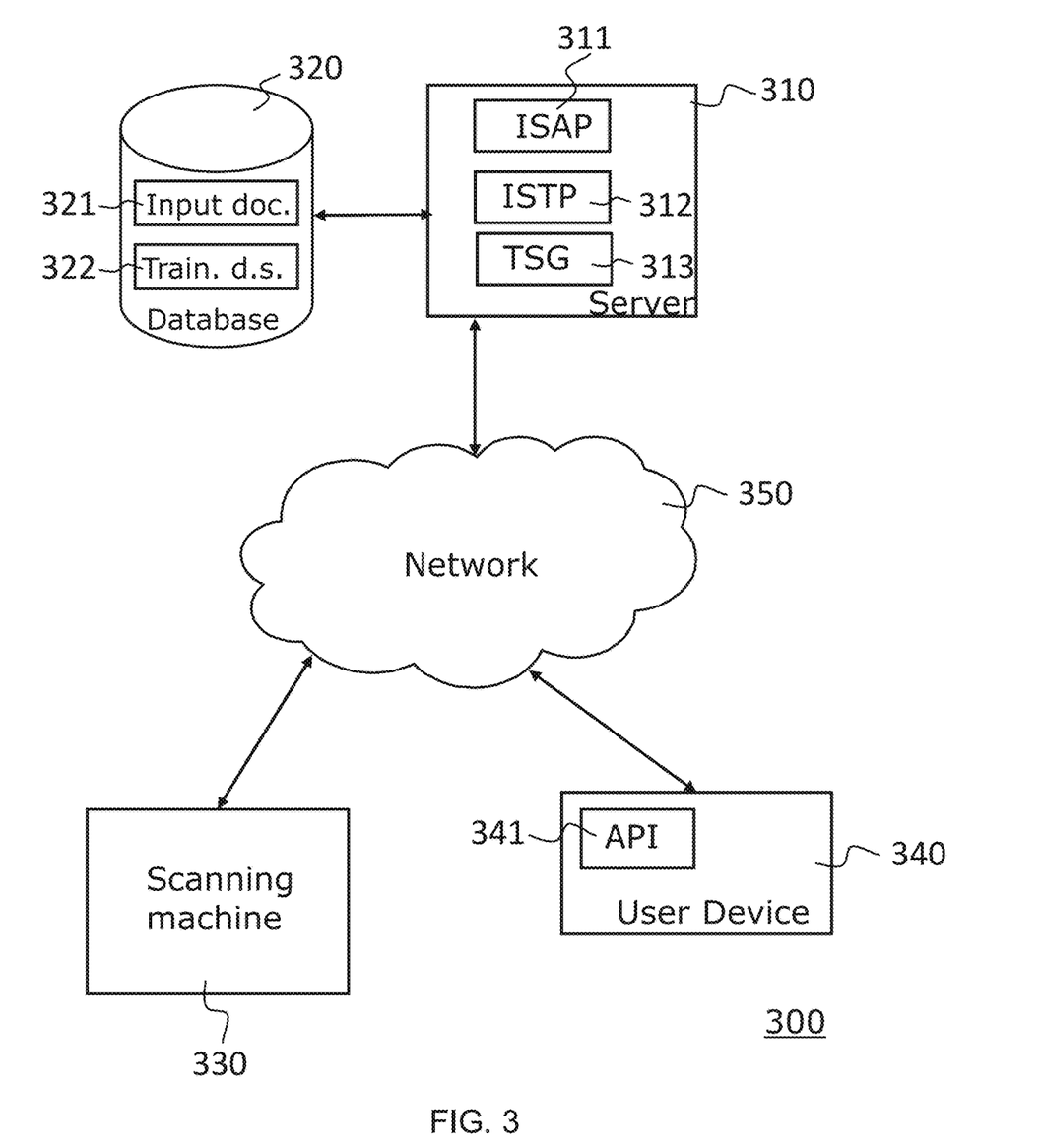
FIG. 3 shows a schematic block diagram of system according to an embodiment of the invention.

Referring at first to FIG. 3, it shows a computing system 300 comprising a server 310 which is configured to run an image segmentation application program (ISAP) 311, an image segmentation training program (ISTP) 312 for training the image segmentation application program and a training set generation program (TSG) 313 for generating a training data set for the ISAP 311.

The server 310 is coupled with a database 320. The database 320 may comprise a storage 321 for storing a plurality of input documents and a storage 322 for storing training data sets.

The system 300 further comprises a scanning machine 330. The scanning machine 330 may provide scanning as well as printing functionality. Hence the scanning machine 330 may also be denoted as scanning/printing machine. The system 300 further comprises a user device 340. The user device 340 may comprise a display and user input means such as a keyboard to provide a user interface to a user of the system 300. The user device 340 may comprise in particular an application programming interface (API) 341 that is adapted to provide an interface to the programs ISAP 311, ISTP 312 and TSG 313 running on the server 310.

The server 310, the scanning machine 330 and the user device 340 are coupled to a network 350 and may communicate with each other via the network 350. The network 350 may be embodied as a local area network (LAN), a general wide area network (WAN) and/or a public network (e.g., the Internet).

Referring now to FIGS. 1 and 2a, the method starts with a block 201. At the block 201, a set of input documents 110 of a first format is provided. The set of input documents may come from a plurality of sources. The set of input documents may in particular comprise input documents related to the respective field of the image segmentation application. The set of input documents may be stored in the storage 321 of the database 320 and the set of input documents may be received e.g. via the network 350.

In FIG. 1 only one input document 110 is shown for ease of illustration. The input document 110 is embodied as a multi-page document. In this example, the input document 110 comprises three document pages 110a, 110b and 110c. The input document 110 may be stored in the storage 321 of the database 320.

At a block 202, the input document 110 is split by the training set generation program 313 into its individual document pages 110a, 110b and 110c. The input document 110 is provided in a first format. According to embodiments, the first format may be a programmatic data format. As mentioned above such a programmatic data format may be defined as a data format that comprises code which represents or defines the fundamental components of the input document 110, in particular predefined items of the input document 110 such as text boxes and paths. According to embodiments the first format may be in particular a format according to the Portable Document Format-standard, in particular according to any version of the ISO 32000-X standard of the International Standard Association.

At a block 203, the training set generation program 313 generates bitmap images 120a, 120b and 120c of a second format for the individual document pages 110a, 110b and 100c respectively of the first format. The bitmap images 120a, 120b and 120c each comprise a predefined number of pixels, e.g. defined by the number of pixels in height and the number of pixels in width. The second format is a bitmap format. According to embodiments the second format may be a format according to the Portable Networks Graphic format, the Joint Photographics Expert Group format or the Tagged Image File Format format.

At a block 204, the training set generation program 313 parses the individual document pages 110a, 110b and 110c of the first format. This includes in particular identifying a predefined set of items including position information of the position of the predefined set of items in the individual document pages. The parsing block 204 may comprise gathering the predefined set of items of each of the one or more individual pages 110a, 110b and 110c into individual page files 130a, 130b and 130c respectively of a third format. The third format may be in particular a text format. According to embodiments, the third format may be a format according to the Java Script Object Notification Data Interchange Format, in particular according to any of the specifications by Douglas Crockford, e.g. RFC 8259, or any specifications by ECMA, e.g. ECMA 404 or any specifications by the International Standards Association, e.g. ISO/IEC 21778:2017. According to embodiments, the third format may be a format according to the Hypertext Markup Language as developed by the Worldwide Web Consortium as standardized in particular by ISO/IEC 15445, W3C HTML 5, 3C HTML 4.0, W3C HTML 3.2 or any further versions. According to yet other embodiments, the third format may be a format according to the YAML Ain't Markup Language.

At blocks 205 and 206, the training set generation program 313 generates masks 140a, 140b and 140c for each of the individual document pages 110a, 110b and 110c respectively. The masks comprise the predefined number of pixels of the corresponding bitmap images 120a, 120b and 120c respectively. According to embodiments the masks 140a, 140b and 140c may be in particular binary masks and the masks may be provided in particular in a fourth format. The generating of the mask as performed in blocks 205 and 206 comprises assigning an encoded class label to each pixel of the masks 140a, 140b and 140c based on the position information of identified items of the predefined set of items. The assigning of the encoded class label may use the individual page files 130a, 130b and 130c of the third format. The assigning of the class label may comprise in particular evaluating whether the respective pixels of the masks 140a, 140b and 140c overlap with an identified item of the predefined set of items or not.

According to embodiments, the predefined set of items comprises text cells and the position information of the text cells include bounding box coordinates of bounding boxes of the text cells. In this example the bitmap image 120a comprises the text cells "Hello" and "world" as well as a table with the numbers "1" and "2". The column lines and row lines of the table establish a path. Likewise, the bitmap image 120b comprises the text cells "Hey" and "all" as well as a table with the numbers "1", "2" and "3". The column lines and row lines of the table establish again a path. The bitmap image 120c comprises the text cells "Hello world" and "Hey all". The individual parsed page files 130a, 130b and 130c of the third format comprise a textual description of the text cells and the paths of the bitmap images 120a, 120b and 120c including the bounding box coordinates of the text cells and the path coordinates and the width of the path.

According to an embodiment the encoded class label of the pixels of the masks 140a, 140b and 140c may be initialized by the training set generation program 313, at a block 205, to a first value. In case of a binary mask they may be set initially to the binary value "0". In this respect the white color in the illustrated example of the binary masks 140a, 140b and 140c may represent a "0". Then, based on the position information provided by the parsed pages 130a, 130b and 130c for the predefined items, the training set generation program 313 assigns, at a block 206, a second value as encoded class label to all pixels of the masks 140a, 140b and 140c that overlap with the identified items of the parsed pages 130a, 130b and 130c according to their position information. In case of a binary mask they may be set to the binary value "1". In this respect the black color in the illustrated example of the binary masks 140a, 140b and 140c may represent a "1". According to the example illustrated in FIG. 1 the number of class labels that are assigned by the training set generation program 313 is only 2, i.e. the respective pixels either belong to or in other words overlap with one of the identified items of the predefined set of items or they do not belong to or overlap with one of these predefined set of items. According to other embodiments, there may be more than 2 class labels. As an example, according to other embodiments two bits may be assigned to each pixel. This allows to assign 4 different class labels to each pixel. This could be e.g. the 4 class labels "text cell", "path", "table" and "no predefined item". Hence in general the masks according to embodiments are 3-dimensional mask with the dimensions number of pixels in height, number of pixels in width and number of class labels.

The bitmap images 120a, 120b and 120c are 3-dimensional images with dimensions number of pixels in height, number of pixels in width and number of color channels. According to embodiments the color channels may be each encoded only with one bit (RGB) and accordingly there would be 3 bits assigned to each pixel of the bitmap images. According to other embodiments each color channel may be encoded with 8 bits and there would be 24 bits assigned to each pixel.

At a block 207, the bitmap images that have been generated in block 203 and the corresponding masks that have been generated in blocks 205 and 206 are paired together as tuple or in other words training tuple and added to a training data set for the image segmentation application. According to the example illustrated in FIG. 1, the bitmap image 120a and the mask 140a form a first tuple, the bitmap image 120b and the mask 140b form a second tuple and the bitmap image 120c and the mask 140c form a third tuple. The tuples may also be denoted as ground-truth tuples and form a training data set 150. The training data set 150 establishes according to embodiments a pixel-perfect ground truth for the image segmentation application.

Figure 2B:
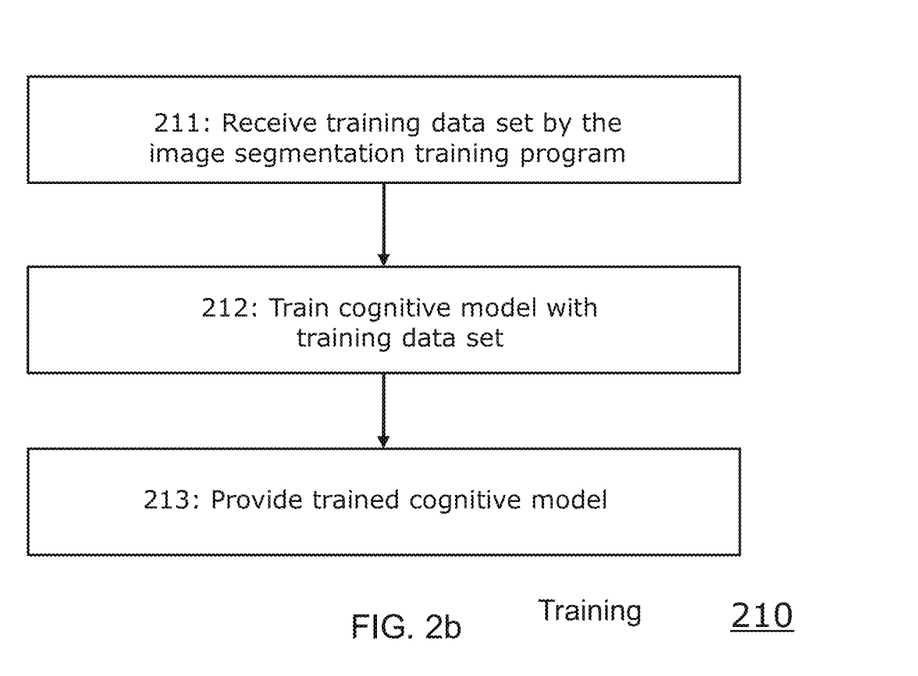
FIG. 2b shows a computer-implemented method for training an image segmentation application with a training data set.

The generated training data set 150 comprising the ground truth tuples may then be used by a computer-implemented method 210 for training an image segmentation application as illustrated in FIG. 2b.

At a block 211, a training data set is received, e.g. by the image segmentation training program 312. At a block 212, the image segmentation training program 312 trains a cognitive model of the image segmentation application program 311 with the training data set 150.

At a block 213, the image segmentation training program 312 provides the trained cognitive model as output.

Figure 2C:
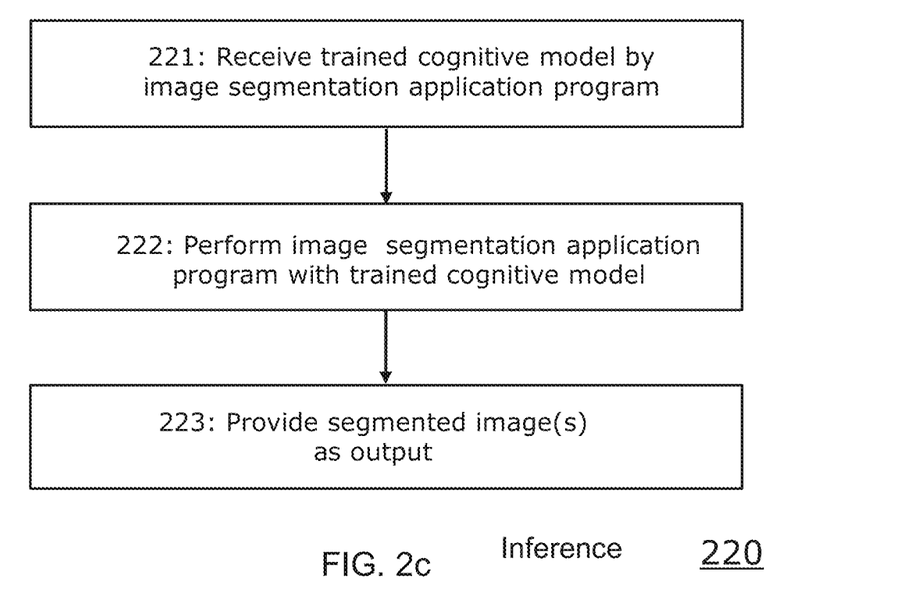
FIG. 2c shows a computer-implemented method for performing an image segmentation application.

Referring now to FIG. 2c, a computer-implemented method 220 for performing an image segmentation application is provided. The method may be performed e.g. by the image segmentation application program 311 as shown in FIG. 3.

At a block 221, the image segmentation application program 311 receives a trained cognitive model, e.g. from the image segmentation training program 312.

At a block 222, the image segmentation application program 311 uses the cognitive model to perform the image segmentation application.

At a block 223, the image segmentation application program 311 provides one or more segmented images as output.

The computer-implemented method 220 as shown in FIG. 2c establishes an inference phase of the image segmentation application and its underlying algorithm.

Figure 4A:
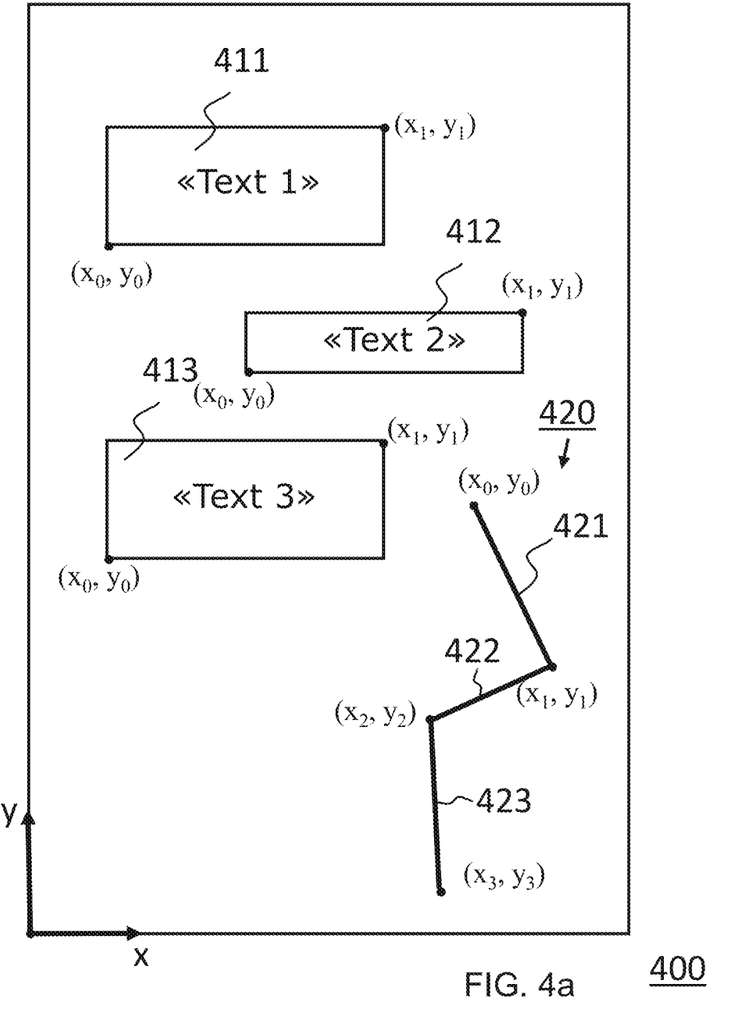
FIG. 4a illustrates an example of an individual document page of a first format.

FIG. 4a illustrates an example of an individual document page 400 of the first format which may be in particular a programmatic format such as the PDF-format. According to this example it is assumed that the image segmentation application for which the ground-truth shall be generated shall be trained to identify two categories of predefined items, namely text cells and paths. For ease of illustration, FIG. 4 shows only the items of these two categories. However, the individual document page 400 may comprise many other elements such as pictures and background which are not shown in FIG. 4.

In this example the individual page 400 comprises three text cells 411, 412 and 413. The text cell 411 comprises the exemplary text "Text 1" as well as a bounding box defined by the coordinates ($x_0$, $y_0$) of the lower left corner and the coordinates ($x_1$, $y_1$) of the upper right corner. The coordinates may be defined e.g. with respect to a x-y-coordinate system that has its origin in the lower left corner of the individual page 400. Furthermore, the text cell 412 comprises the exemplary text "Text 2" and the text cell 413 comprises the exemplary text "Text 3". In addition, both text cells 412 and 413 are defined by corresponding bounding boxes defined by the coordinates ($x_0$, $y_0$) of the lower left corner and the coordinates ($x_1$, $y_1$) of the upper right corner. It should be noted that for ease of illustration the coordinates of the bounding boxes are generally and uniformly denoted as ($x_0$, $y_0$) for the lower left corner and ($x_1$, $y_1$) for the upper right corner, wherein the variables $x_0$, $y_0$, $x_1$ and $y_1$ represent different actual values for the different bounding boxes.

In addition to the text cells the page 400 comprises a path 420. The path 420 comprises three straight lines 421, 422 and 423. The straight line 421 is defined by the coordinates ($x_0$, $y_0$) and ($x_1$, $y_1$) denoting the start point and the end point of the straight line 421, the straight line 422 is defined by the coordinates ($x_1$, $y_1$) and ($x_2$, $y_2$) denoting the start point and the end point of the straight line 422 and the straight line 423 is defined by the coordinates ($x_2$, $y_2$) and ($x_3$, $y_3$) denoting the start point and the end point of the straight line 423. According to embodiments, the computer-implemented method may also identify the color and the width of the path 420.

According to embodiments, the computer-implemented method gathers the predefined set of items of the individual document page 400 into an individual page file 450 of a third format.

The third format may be in particular a text format. It can generally be freely defined and describes basic information on the identified items in a text format.

Figure 4B:
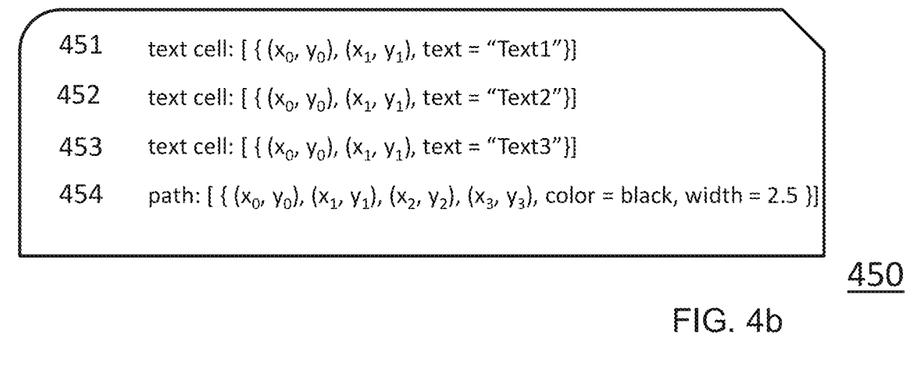

FIG. 4b shows an example of such an individual page file 450 of the third format that corresponds to the parsed version of the individual page 400 of FIG. 4a. In this example the individual page file 450 comprises four lines 451-454, each comprising textual information about one of the predefined items of FIG. 4a.

Generally, any suitable syntax may be used to define the second format. In this example the string "text cell:" defines that parameters of a text cell are given in subsequent rectangular brackets. The rectangular brackets comprise the position of the lower left and upper right corner of the bonding box of the text cell, each in round brackets, followed by the text in parentheses after the string "text=". Corresponding examples for the text cells 411, 412 and 413 are provided in the lines 451, 452 and 453 respectively.

In addition, the string "path:" defines that parameters of a path are given in subsequent rectangular brackets. The rectangular brackets comprise the positions of the connection points or junctions of the path, followed by the color after the string "color=" and followed by the width of the path after the string "width=".

A corresponding example for the path 420 is provided in the line 454.

It should be noted that the exemplary format given above may comprise a plurality of further or other syntax elements to define the parsed and identified items of the individual page files of the first format.

According to embodiments, the Java Script Object Notification Data Interchange Format (JSON-Format) may be used as third format. According to such an embodiment any of the specifications of JSON-Format by Douglas Crockford, e.g. RFC 8259, or any specifications of the JSON-Format by ECMA, e.g. ECMA 404 or any specifications of the JSON-Format by the International Standards Association, e.g. ISO/IEC 21778:2017, may be used. According to another embodiment, the Hypertext Markup Language as developed by the Worldwide Web Consortium and as standardized in particular by ISO/IEC 15445, W3C HTML 5, 3C HTML 4.0, W3C HTML 3.2 or any further versions may be used for the third format. According to yet another embodiment, the YAML Ain't Markup Language (YAML) may be used as third format.

Figure 5:
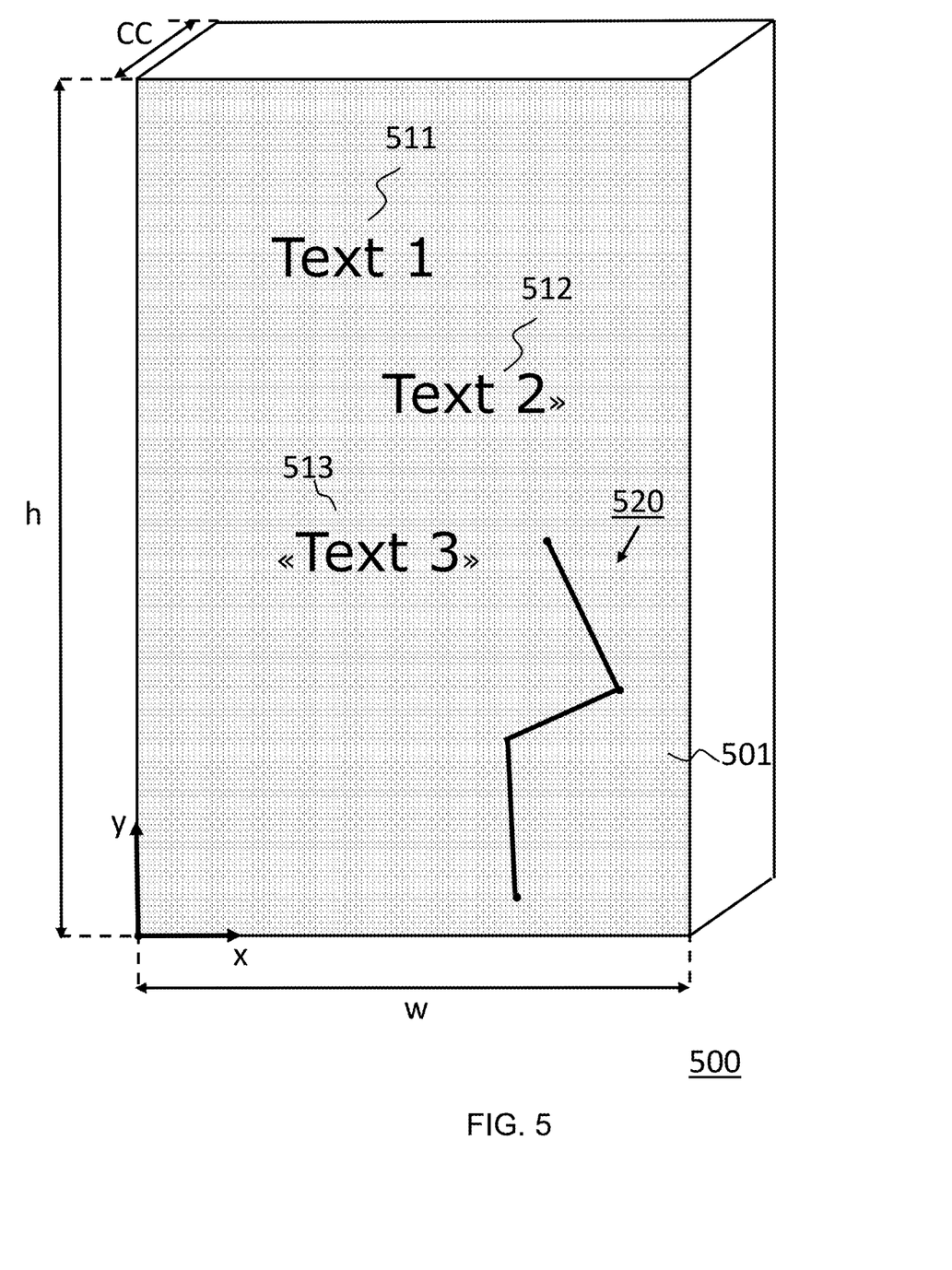
FIG. 5 shows an exemplary embodiment of a bitmap image of a second format that has been generated from the individual document page of the first format.

FIG. 5 shows an exemplary embodiment of a bitmap image 500 of a second format that has been generated from the individual document page 400 of the first format, e.g. by means of a conversion program configured to covert documents of the first format into documents of the second format. As an example, a PDF-to-PNG-converter may be used according to embodiments.

The bitmap image 500 has a width w, a height h and a plurality of pixels 501. The bitmap image is a 3-dimensional image with the dimensions number of pixels in height h, number of pixels in width w and number of color channels cc. According to embodiments three color channels R, G and B (red, green blue) are assigned to each pixel. The color of each color channel may be defined by one or more bits. The bitmap image 500 comprises three text cells 511, 512 and 513, comprising the texts "Text1", Text2" and "Text 3" respectively. In addition, the bitmap image comprises a path 520. These items correspond to the items 411, 412, 413 and 420 of FIG. 4. While the items 411, 412, 413 and 420 of FIG. 4 have been defined by code in the first format, the items 511, 512, 513 and 520 are commonly formed by individual pixels of the bitmap image 500. The pixels of the bitmap image 500 may represent many other elements such as pictures and background which are not shown for ease of illustration, but just in illustrated in a general way by the small grid pattern.

Figure 6:
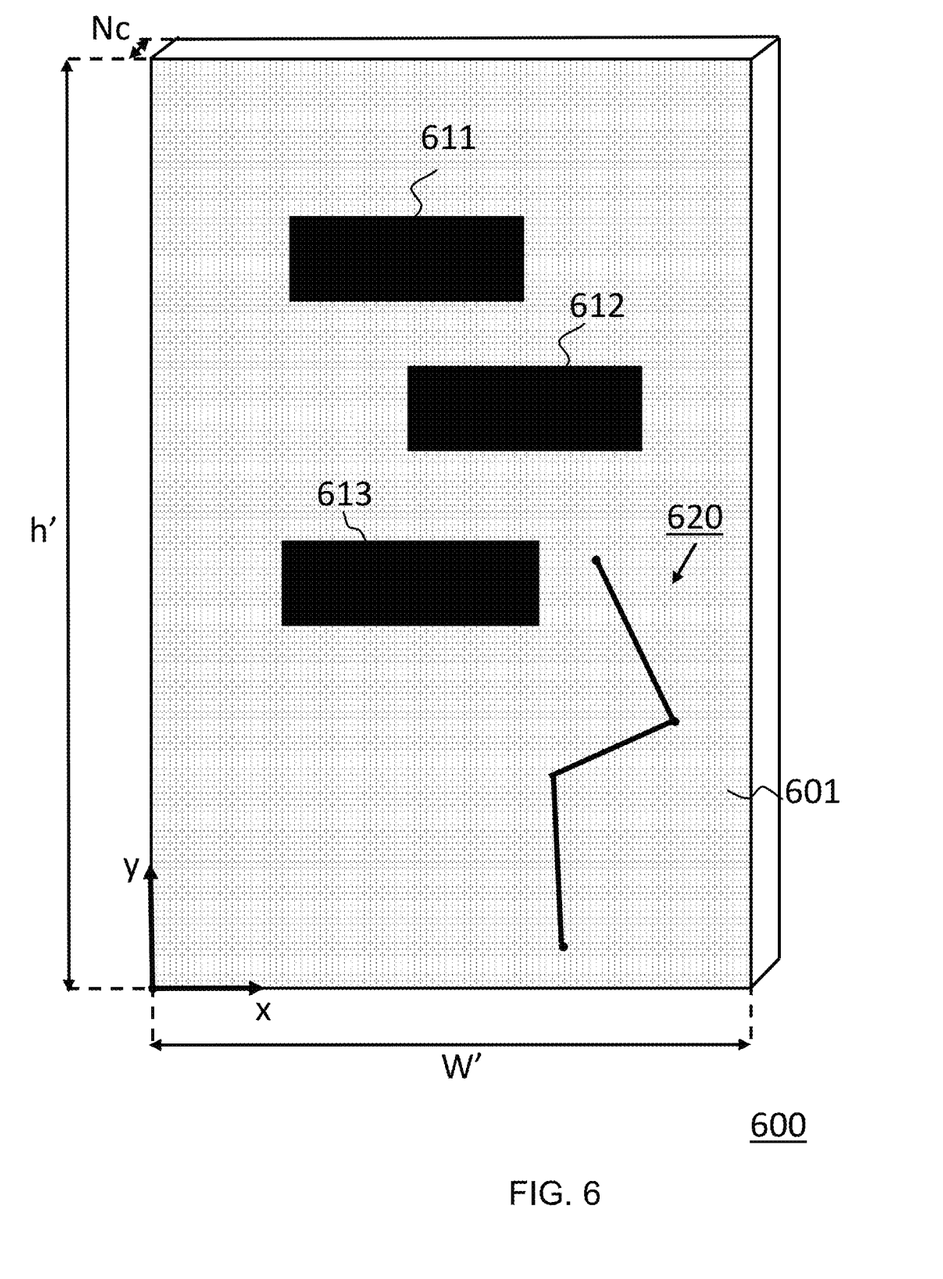

FIG. 6 shows a mask 600 that has been generated by parsing the individual document page 400 of the first format as shown in FIG. 4a. The parsed items 411, 412, 413 and 420 have been gathered into the individual page file 450 of the third format and the individual page file 450 may be used advantageously to generate the mask 600. Items 611, 612, 613 and 620 are commonly formed as part of the generated mask, and correspond to items 411, 412, 413, and 420.

The mask 600 has a width w', a height h' and a plurality of pixels 601. The width w' is the same as the width w of the bitmap image 500 and the height h' is the same as the height h of the bitmap image 500. Furthermore, the mask 600 comprises the same number of pixels as the corresponding bitmap image 500 of FIG. 5.

The mask is a 3-dimensional mask with the dimensions number of pixels in height h', number of pixels in width w' and number of class labels Nc. According to embodiments the mask 600 may be a binary mask that comprises only 1 bit to define the class labels. According to such an embodiment the class label Nc just defines whether the respective pixel overlaps with one of the parsed items 411, 412, 413, 420 or not. If there is an overlap, the respective pixel may be assigned a "1" as encoded class label and if there is no overlap the respective pixel may be assigned a "0" as encoded class label. In FIG. 6 a dark color shall represent a "1" and hence indicate that the respective pixel overlaps with one of the items 411, 412, 413, 420. A white color/white pixel shall represent a "0" and hence indicate that the respective pixel does not overlap with one of the items 411, 412, 413, 420. The assigning of the encoded class label may use the position information of the items gathered in the individual page file 450 and may compare, pixel by pixel, based on this position information whether the corresponding pixel of the binary mask 600 overlaps with one of the predefined items as defined by the position information of the individual page file 450.

According to embodiments the ground-truth provided by the generated training set may be further augmented e.g. by adding a masked signature to the bitmap image 500 and a corresponding class label to the corresponding mask 600 to train signature identification. The masked signatures can be modulated e.g. from existing datasets, e.g. the ICDAR signature dataset.

According to embodiments the ground-truth provided by the training set may be further augmented e.g. by adding a masked handwritten text to the bitmap image and a corresponding class label the corresponding mask.

According to embodiments the ground-truth provided by the training set may be further augmented e.g. by adding affine transformations to the bitmap image and the corresponding mask in order to simulate scanning distortions. Such scanning distortions may include rotation, scale and/or translation.

According to embodiments the ground-truth provided by the training set may be further augmented by adding noise to the bitmap image. The noise may be added e.g. by overlaying one or more times a scanned blank paper to the bitmap image. Thereby additional noise levels may be simulated. The scanned blank paper may be provided by the scanning machine 330.

Figure 7:
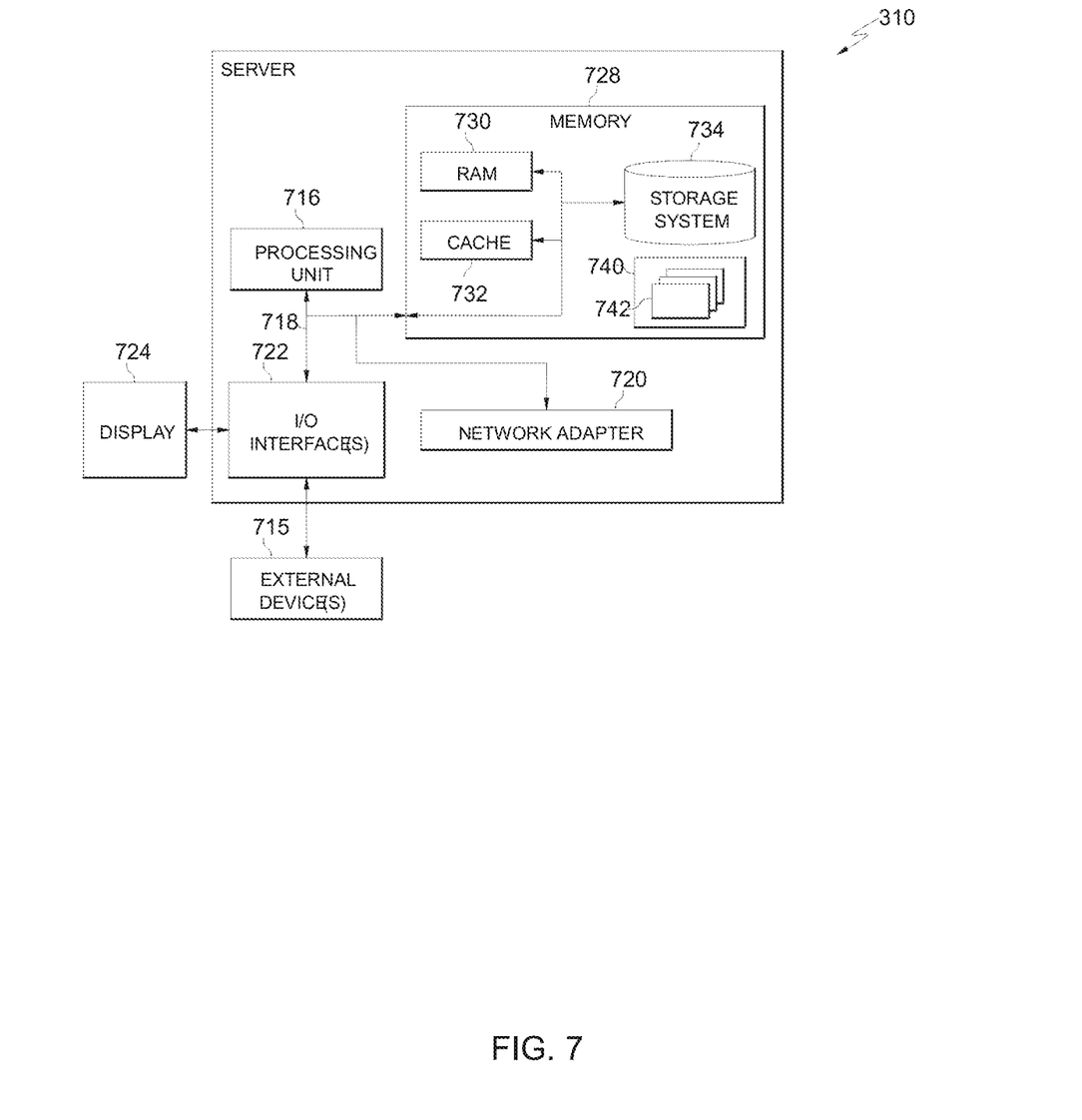
FIG. 7 shows a more detailed block diagram of a server according to an embodiment of the invention.

Referring now to FIG. 7, a more detailed embodiment of the server 310 is illustrated. The server 310 may be operational with numerous other computing system environments or configurations. Examples of well-known computing systems, environments, and/or configurations that may be suitable for use with server 310 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. In particular the server 310 is operational with the scanning machine 330 of the system 300 and a user device 340 of the system 300 as shown in FIG. 3.

The server 310 may be described in the general context of computer system-executable instructions, such as program modules, being executed by a computer system. Generally, program modules may include routines, programs, objects, components, logic, data structures, and so on that perform particular tasks or implement particular abstract data types. The server 310 is shown in the form of a general-purpose computing device. The components of server 310 may include, but are not limited to, one or more processors or processing unit(s) 716, a system memory 728, and a bus 718 that couples various system components including system memory 728 to processing unit 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Server 310 typically includes a variety of computer system readable media. Such media may be any available media that is accessible by server 310, and it includes both volatile and non-volatile media, removable and non-removable media.

System memory 728 can include computer system readable media in the form of volatile memory, such as random access memory (RAM) 730 and/or cache memory 732. Server 310 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein. Program modules 742 may carry out in particular one or more steps of computer-implemented methods for ground-truth generation and training data of electronic documents according to embodiments of the invention, e.g. one or more steps of the method as described with reference to FIGS. 2a, 2b and/or 2c. Program modules 742 may encompass in particular the programs 311, 312 and 313 as described with reference to FIG. 3 and the corresponding flow charts in FIGS. 2a, 2b and 2c.

Server 310 may also communicate with one or more external devices 715 such as a keyboard, a pointing device, a display 724, etc.; one or more devices that enable a user to interact with server 310; and/or any devices (e.g., network card, modem, etc.) that enable server 310 to communicate with one or more other computing devices. Such communication can occur via Input/Output (I/O) interfaces 722. Still yet, server 310 can communicate with one or more networks such as a local area network (LAN), a general wide area network (WAN), and/or a public network (e.g., the Internet) via network adapter 720. As depicted, network adapter 720 communicates with the other components of server 310 via bus 718. It should be understood that although not shown, other hardware and/or software components could be used in conjunction with server 310. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor/processing unit of the server 310 and/or the user device 340 to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
providing a set of input documents of a first format, each input document comprising one or more document pages;
splitting the input documents into individual document pages of the first format;
parsing the individual document pages of the first format, the parsing comprising identifying a predefined set of items including position information of the position of the predefined set of items in the individual document pages;
generating a bitmap image of a second format for each individual document page of the first format, the bitmap image comprising a predefined number of pixels;
generating a mask for each individual document, the mask comprising the predefined number of pixels of the corresponding bitmap image; and
the generating of the mask comprises assigning an encoded class label to each pixel of the mask based on the position information of identified items of the predefined set of items.

2. The method according to claim 1, wherein the assigning of the class label comprises evaluating whether the respective pixel of the mask overlaps with an identified item of the predefined set of items or not.

3. The method according to claim 1, wherein the mask is a binary mask.

4. The method according to claim 1, wherein
the predefined set of items comprises text cells; and
a position information of the text cells include bounding box coordinates of bounding boxes of the text cells.

5. The method according to claim 1, wherein
the predefined set of items comprises paths; and
the position information comprises a path coordinates and a width of the path.

6. The method according to claim 1, wherein
the mask is a 3-dimensional mask with dimensions number of pixels in height, number of pixels in width and number of class labels.

7. The method according to claim 1, wherein
the bitmap images are 3-dimensional images with dimensions number of pixels in height, number of pixels in width and number of color channels.

8. The method according to claim 1, wherein the generating of the mask comprises:
initializing the encoded class label of all pixels of the mask to a first value; and
assigning a second value as encoded class label to all pixels of the mask that overlap with an identified item of the predefined set of items according to the position information of the predefined set of items.

9. The method according to claim 1, further comprising:
providing the bitmap image and the corresponding mask as tuple to a training data set for an image segmentation application.

10. The method according to claim 1, wherein the training data set comprises:
a plurality of individual document pages of the first format;
a bitmap image of the second format for each of the plurality of individual document pages of the first format, the bitmap comprising a predefined number of pixels;
a mask for each of the plurality of individual document pages of the first format, the mask comprising the predefined number of pixels of the corresponding bitmap image; and
an encoded class label assigned to each pixel of the mask based on position information of identified items of the predefined set of items.

11. The method according to claim 1, further comprising: adding a masked signature to the bitmap image.

12. The method according to claim 1, further comprising: adding a masked handwritten text to the bitmap image.

13. The method according to claim 1, further comprising: adding affine transformations to the bitmap image and the corresponding mask in order to simulate scanning distortions.

14. The method according to claim 1, further comprising: adding noise to the bitmap image.

15. The method according to claim 1, wherein the first format is a programmatic data format.

16. The method according to claim 1, wherein the first format is a format according to a Portable Document Format-standard, according an ISO 32000-X standard of an International Standard Association.

17. The method according to claim 1, wherein the second format is a format selected from the group consisting of:
Portable Networks Graphic format;
Joint Photographics Expert Group format; and
Tagged Image File Format format.

18. The method according to claim 1, further comprising:
gathering the predefined set of items of each of the one or more individual pages of the plurality of documents into individual page files of a third format; and
the assigning of the encoded class label uses the individual pages files of the third format.

19. The method according to claim 18, wherein the third format is selected from the group consisting of: Java Script Object Notification Data Interchange Format; Hypertext Markup Language; and YAML A'int Markup Language.

20. The method according to claim 1, wherein the mask has a predefined fourth format.

21. A system comprising one or more processors for executing computer-readable instructions, the computer-readable instructions controlling the one or more processors to perform operations comprising:
providing a set of input documents of a first format, each of the set of input documents comprising one or more document pages;
splitting the input documents into its individual document pages;
parsing the individual document pages of the first format, the parsing comprising identifying a predefined set of items including position information of the position of the predefined set of items in the individual document pages;
generating a bitmap image of a second format for each individual document page of the first format, the bitmap image comprising a predefined number of pixels;
generating a mask for each individual document page, the mask comprising the predefined number of pixels of the corresponding bitmap image; and
assigning an encoded class label to each pixel of the mask based on the position information of identified items of the predefined set of items.

22. A computer program product comprising a computer-readable storage medium having program instructions embodied therewith, the program instructions executable by a processor to cause the processor to perform operations comprising:
providing a set of input documents of a first format, each of the input documents comprising one or more document pages;
splitting the input documents into individual document pages;
parsing the individual document pages of the first format, the parsing comprising identifying a predefined set of items including position information of the position of the predefined set of items in the individual document pages;
generating a bitmap image of a second format for each individual document page of the first format, the bitmap image comprising a predefined number of pixels;
generating a mask for each individual document page, the mask comprising the predefined number of pixels of the corresponding bitmap image; and
assigning an encoded class label to each pixel of the mask based on the position information of identified items of the predefined set of items.

* * * * *